United States Patent
Gala et al.

(10) Patent No.: US 12,475,306 B1
(45) Date of Patent: Nov. 18, 2025

(54) METHOD AND SYSTEM FOR MERGING PDF DOCUMENTS WITH INTERACTIVE TABLE OF CONTENTS

(71) Applicant: MORGAN STANLEY SERVICES GROUP INC., New York, NY (US)

(72) Inventors: Jigar K. Gala, Mumbai (IN); Rohan M. Barai, Mumbai (IN); Melanie Dorn, Great Neck, NY (US); Akshat K. Gandhi, Mumbai (IN); Afshir M. Irani, Bronx, NY (US); Jeffrey M. Kaufman, Port Washington, NY (US); Nalini Kanta Nanda, Mumbai (IN); Harikumar Pillai, Mumbai (IN)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 19/206,290

(22) Filed: May 13, 2025

(51) Int. Cl.
    *G06F 40/00*     (2020.01)
    *G06F 40/166*     (2020.01)
    *G06V 30/416*     (2022.01)

(52) U.S. Cl.
    CPC .......... *G06F 40/166* (2020.01); *G06V 30/416* (2022.01)

(58) Field of Classification Search
    CPC ............................ G06F 40/166; G06V 30/416
    See application file for complete search history.

(56) References Cited

U.S. PATENT DOCUMENTS

| | | | |
|---|---|---|---|
| 5,801,702 A * | 9/1998 | Dolan | G06F 16/957 709/200 |
| 5,978,818 A * | 11/1999 | Lin | G06F 40/134 715/209 |
| 6,122,647 A * | 9/2000 | Horowitz | G06F 16/954 707/999.005 |
| 6,769,096 B1 * | 7/2004 | Kuppusamy | G06F 16/94 707/999.01 |
| 8,539,332 B2 * | 9/2013 | Hatakeyama | G06F 40/143 715/208 |
| 11,030,387 B1 * | 6/2021 | Juhl | G06F 40/131 |

(Continued)

OTHER PUBLICATIONS

Jeff P, "Adobe Acrobat—Creating a Table of Contents in PDFs", Apr. 17, 2025, 6 pages https://kb.siue.edu/page.php?id=148777.*
Dochub, "Combine table of contents document easily", Dec. 8, 2023, 8 pages https://web.archive.org/web/20231208120130/https://www.dochub.com/en/functionalities/combine-table-of-contents-document.*

(Continued)

*Primary Examiner* — William L Bashore
*Assistant Examiner* — David Faber
(74) *Attorney, Agent, or Firm* — Weitzman Law Offices, LLC

(57) ABSTRACT

A method for creating a navigable PDF document is disclosed and involves receiving at least two content segments, each with a corresponding data structure including a title, a page count value, and a page number value. The method determines the page number value for each content segment. A set of table of contents pages is generated, populated with the titles and page numbers of the content segments. The table of contents is processed to identify title and page number positions, and pointers are established to link each title to the corresponding content segment's start location. The merged PDF document is created by combining the table of contents with the content segments, enabling users to navigate to specific portions of the document by selecting the pointers. A corresponding system is also disclosed.

15 Claims, 9 Drawing Sheets

(56) References Cited

U.S. PATENT DOCUMENTS

| | | | | |
|---|---|---|---|---|
| 11,687,700 | B1* | 6/2023 | Pfitzmann | G06V 30/414 715/234 |
| 2003/0068099 | A1 | 4/2003 | Chao et al. | |
| 2006/0282760 | A1* | 12/2006 | Tanaka | G06V 30/416 707/999.1 |
| 2007/0300295 | A1* | 12/2007 | Kwok | G06Q 10/10 726/10 |
| 2009/0144277 | A1* | 6/2009 | Trutner | G06F 40/137 707/999.102 |
| 2014/0298164 | A1* | 10/2014 | Terayoko | G06F 40/103 715/243 |
| 2016/0048482 | A1* | 2/2016 | Tsui | G06F 16/24578 715/251 |
| 2019/0102618 | A1 | 4/2019 | Honda | |
| 2019/0243905 | A1* | 8/2019 | Kannan | G06F 16/183 |
| 2024/0005083 | A1* | 1/2024 | Liang | G06F 40/143 |

OTHER PUBLICATIONS

Evermap, "Creating Table of Contents From PDF Bookmarks", Oct. 9, 2019, 35 pages https://web.archive.org/web/20191009011450/https://evermap.com/Tutorial_ABM_TOCFromBookmarks.asp.*

University of Central Florida, "How to: Create a Clickable Table of Contents (TOC)" Apr. 2020, 11 pages https://academicsuccess.ucf.edu/wp-content/uploads/sites/22/2020/04/Creating_Clickable_Table_of_Content_Word_PC_and_Mac.pdf.*

Zoew, Piers, "4 Methods on How to Create Table of Contents in PDF" Sep. 4, 2024, 12 pages https://www.pdfgear.com/pdf-editor-reader/how-to-create-table-of-contents.htm.*

Owen, Malcolm, "How to merge together multiple PDF documents using Preview in macOS", May 17, 2018, 5 pages https://web.archive.org/web/20220428011550/https://appleinsider.com/articles/15/05/17/how-to-merge-together-multiple-pdf-documents-using-preview-in-macos.*

* cited by examiner

FIG. 7

| Dummy | Doc 1 | Doc 2 | ... | Doc n |
|---|---|---|---|---|
| | Title<br># of pages<br>Page # | Title<br># of pages<br>Page # | ... | Title<br># of pages<br>Page # |

| TOC page 1 | TOC page 2 | ... | TOC page n |
|---|---|---|---|
| 904-1a<br>Title<br>height<br>Width<br>X coord<br>Y coord | 904-2a<br>Title<br>height<br>Width<br>X coord<br>Y coord | | 904-na<br>Title<br>height<br>Width<br>X coord<br>Y coord |
| 904-1b<br>Page #<br>height<br>Width<br>X coord<br>Y coord | 904-2b<br>Page #<br>height<br>Width<br>X coord<br>Y coord | ... | 904-nb<br>Page #<br>height<br>Width<br>X coord<br>Y coord |
| 904-1c<br>Title<br>height<br>Width<br>X coord<br>Y coord | 904-2c<br>Title<br>height<br>Width<br>X coord<br>Y coord | | |
| 904-1d<br>Title<br>height<br>Width<br>X coord<br>Y coord | 904-2d<br>Title<br>height<br>Width<br>X coord<br>Y coord | | |

906-1, 906-2, 906-n (column headers)

902-1, 902-2, 902-n (column groupings)

900

METHOD AND SYSTEM FOR MERGING PDF DOCUMENTS WITH INTERACTIVE TABLE OF CONTENTS

FIELD

This disclosure generally relates to digital document processing and, more particularly, to systems and methods for generating, managing, and automating the creation of PDF documents.

BACKGROUND

PDF documents are a valuable way to exchange documents among users because they are portable, meaning that they will look the same irrespective of the hardware or software used to view them. This is in sharp contrast to other types of documents, such as word processing files, web pages or other types of files, which may appear different from hardware system to hardware system or even the same program running on different operating systems. As such, it is useful to create PDF documents from other types of documents for exchange purposes.

Similarly, at times, there may be a need to combine multiple PDF documents. While there exist utilities to create PDF documents and others to combine multiple documents into a single PDF document, such utilities are fairly rudimentary and discrete. For example, utilities that can combine multiple documents into a single PDF document lack any provision for allowing the created single PDF document to indicate where each constituency document begins and/or ends.

SUMMARY

Our solution provides for the creation of a PDF document merged from multiple sources with an interactive table of contents, enabling seamless navigation between multiple content segments.

One aspect involves a method for creating a merged navigable PDF document. The method involves receiving an input comprising at least two content segments, each content segment having a corresponding data structure including at least a title, a page count value, and a page number value. Determining, for each data structure, the page number value by adding together one, an offset corresponding to a total number of table of contents pages, and a total sum of the page counts of any previously processed content segments, unless no previously processed content segments exist, in which case, the total sum of the page counts is used as zero. Generating a set of table of contents pages with the title and the page number value of each content segment to produce a set of populated table of contents pages having a specified number of pages. Processing the set of populated table of contents pages to identify a set of title positions and a set of page number positions. A title position of the set of title positions corresponds to a content segment title and a page number position of the set of page number positions corresponds to a content segment page number. Establishing, based on the set of title positions and the set of page number positions, a set of pointers on the set of populated table of contents pages such that each pointer in the set of pointers indicates a start location of each successive contents segment of the merged PDF document. Creating the merged PDF document by combining the set of table of contents pages with the at least two content segments, such that when a user views the merged PDF document and selects one of the set of pointers in one of the set of populated table of contents pages, the user is navigated to a corresponding portion of the merged PDF document. Storing the merged PDF document in a non-transitory storage for access and viewing by the user.

Another aspect involves a system for creating a navigable PDF document. The system involves a processor, a non-transitory memory, an input interface configured to receive an input comprising at least two content segments, each content segment associated having a corresponding data structure that includes at least a title, a page count value, and a page number value. A numbering process executable by the processor, and configured to determine, for each data structure, a page number value by adding together one, an offset corresponding to a total number of table of contents pages, and a total sum of the page counts of any previously processed content segments. If no previously processed content segments exist, the total sum of the page counts is zero. a table of contents template process executable by the processor, configured to generate a set of table of content pages with the title and the page number value of each content segment to produce a set of populated table of contents pages having a specified number of pages. A parsing process executable by the processor, and configured to process the table of contents to identify a set of title positions and a set of page number positions. A title position of the set of title positions corresponds to a content segment title and a page number position of the set of page number positions corresponds to a content segment page number. A pointer establishment process executable by the processor, and configured to, based on the set of title positions and the set of page number positions, a set of pointers on the set of populated table of contents pages that each indicate a start location of each successive contents segment of the merged PDF document. A merging process executable by the processor, and configured to create a merged PDF document by combining the set of table of contents pages with the at least two content segments and store the merged PDF document in the non-transitory memory, such that when a user accesses the stored merged PDF document and views the merged PDF document and selects one of the set of pointers in one of the set of populated table of contents pages, the user will be navigated to a corresponding portion of the merged PDF document.

Some implementations of the teachings herein can achieve one or more of: improved document navigation, easier content merging, or enhanced user experience through a dynamic and functional table of contents in the created PDF document.

BRIEF DESCRIPTION OF THE DRAWINGS

This disclosure is further described in the detailed description that follows, with reference to the drawings, wherein the same reference numbers appearing in the various drawings and description designate corresponding or like elements among the different views. and in which:

FIG. 7 illustrates, in simplified form, a representative overview of a "tocContent" array in accordance with the teachings herein;

FIG. 9 illustrates, in simplified form, a representative overview of a "tocPagesWithTextItems" array in accordance with the teachings herein.

DETAILED DESCRIPTION

In simplified overview, we have developed a method and system for creating a merged PDF document with an interactive table of contents. This method involves receiving multiple content segments, determining page numbers based on the content's order, creating a table of contents, and linking it to the respective content segments to allow users to navigate seamlessly through the merged document.

In a simplified overview, method and systems are described for dynamically generating a table of contents for multiple PDF documents in conjunction with merging the multiple PDF documents into a single PDF document.

Figure 1:
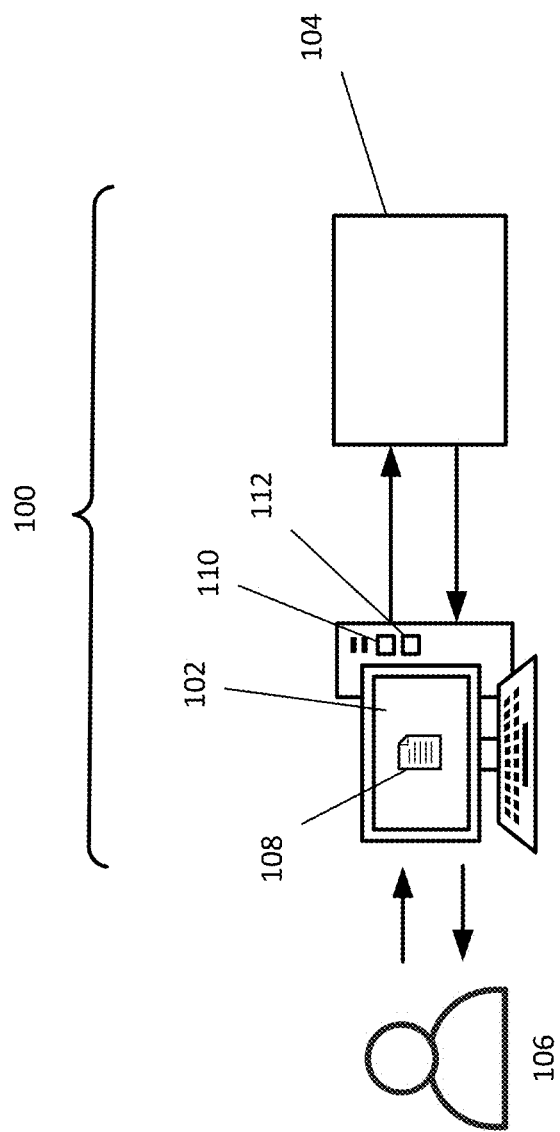
FIG. 1 illustrates, in simplified form, a functional overview of a system configured to use any of URLs, HTML content, or a Dynamic Content template (e.g., Embedded JavaScript) to generate PDF documents in accordance with the teachings herein.

FIG. 1 illustrates, in simplified form, a functional overview of a system 100 configured to use any of URLs, HTML content, or a Dynamic Content template (e.g., Embedded JavaScript) to generate PDF documents.

The system 100 includes a User Interface (UI) 102 and a PDF generation system 104.

The UI 102 provides a way for a user 106 to interact with the system 100 to specify HTML content, URL(s) of web page(s) or Dynamic Content template(s) as inputs to the system 100. The UI 102 also provides a way for the user 106 to view a PDF document 108, stored in a non-transitory memory 112, that is the result of one of the processes described herein.

The PDF generation system 104 comprises program instructions which, when executed by a processor 110 of system 100, receive an input and generate the PDF document 108, and stores the PDF document in the non-transitory memory 112.

Below is a representative example of a conversion request payload for inputs of either HTML or a URL in which a set of configurations can be defined for the PDF generation system 104 followed by a parenthetical indicating the details of what may be included in that field. In this example, the conversion request payload includes a "report" object, having a "fileName" field in which a corresponding value specifies the name under which a resulting PDF document will be saved. A "files" array also exists within the conversion request payload and contains an object, having a "content" array. The "content" array contains a content object, corresponding to a content segment. The content object may specify one of several content types (e.g., "html" or "url") along with the corresponding value (e.g., raw HTML markup or a URL referencing a web page):

```
{
  "report": {
    "fileName": (Will include the name of the generated PDF)
  },
  "files": [
    {
      "content": [
        {
          (Content type: "html" | "url"): (Value associated with that type)
        }
      ]
    }
  ]
}
```

In addition to handling HTML and URL inputs as described above, the PDF generation system 104 can also process Dynamic Content Templates, such as those based on EJS. A representative example of a conversion request payload suitable for Dynamic Content Templates is shown below. In this example, the "dynamicContent" object specifies a format (e.g., "ejs"), a template string, and a data object that supplies values to be inserted into the template.

```
{
  "report": {
    "fileName": (Will include the name of the generated PDF)
  },
  "files": [
    {
      "content": [
        {
          "dyanmicContent" {
            "format": "ejs",
            "template": This is Dynamic Template. <h1><%= header %></h1>",
            "data": {
              "header": "Dynamic Header
            }
          }
        }
      ]
    }
  ]
}
```

Figure 2:
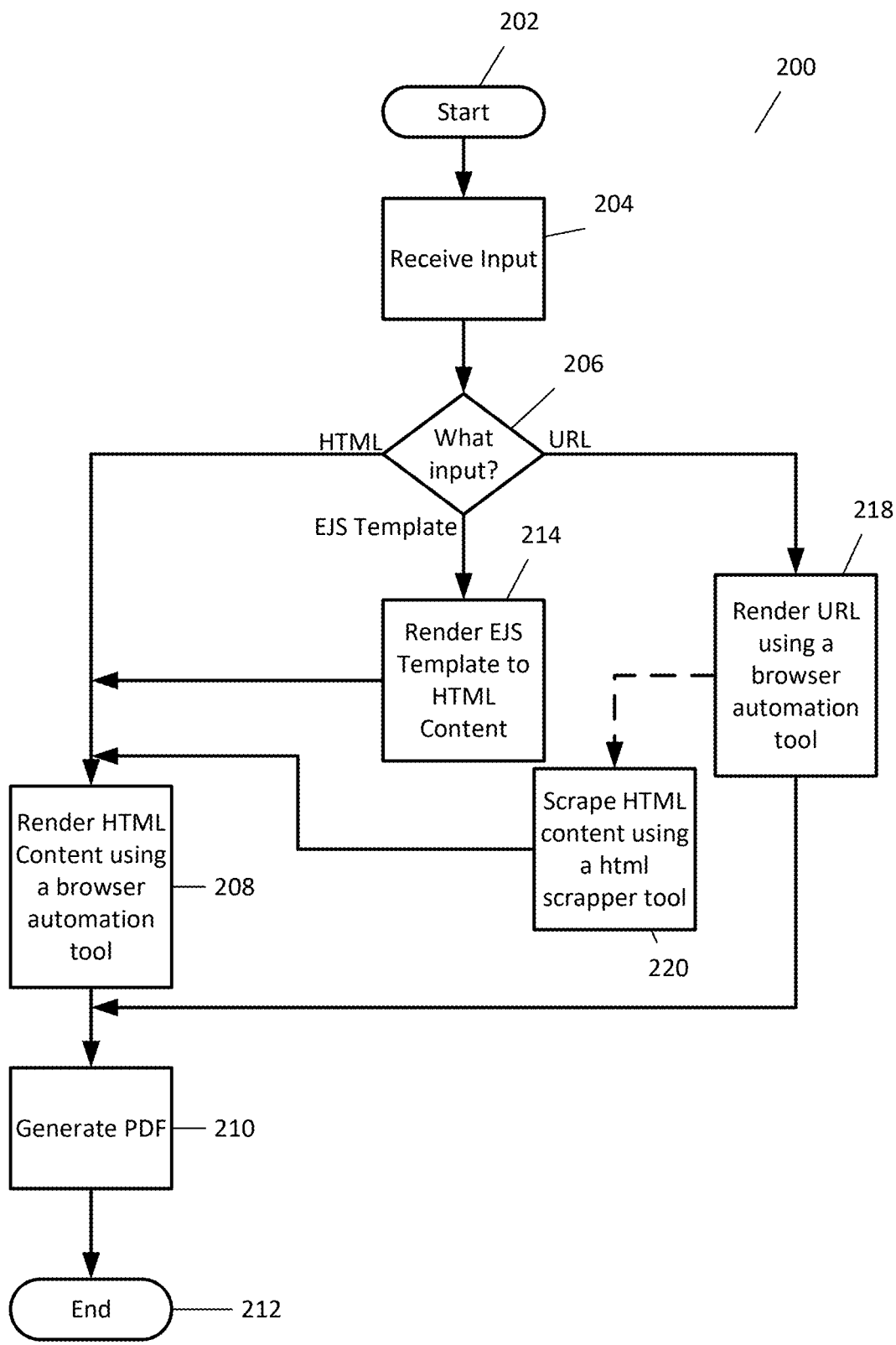
FIG. 2 illustrates, in simplified form, a flowchart for a representative example of a PDF generation process within the PDF generation system, initiated by a request from the user and executed by the processor of the system in accordance with the teachings herein.

FIG. 2 illustrates, in simplified form, a flowchart 200 for a representative example of a PDF generation process within the PDF generation system 104, initiated by a request from the user 106 and executed by the processor 110 of the system 100 in accordance with the teachings herein.

The process begins (Step 202) when the PDF generation system 104 receives an input (Step 204) of a request payload as shown above. The "content" array of the request payload is then examined in the PDF generation process to determine the type of input content provided (Step 206).

If the content type is HTML, a browser automation tool is used to render the HTML content, for example, within a headless browser environment onto a webpage (Step 208). Once the webpage is fully rendered, the browser automation tool invokes the browser's native print-to-PDF functionality to generate a PDF buffer (Step 210), which is then saved in the non-transitory memory 112 as the PDF document, after which the process concludes (Step 212). One such example of a suitable browser automation tools usable for automating page loading, rendering, and invoking the browser's native print-to-PDF functionality includes, for example, Puppeteer, which is accessible at "github.com/puppeteer/puppeteer" and supports both Chrome and Firefox browsers.

If the content type is a Dynamic Content Template (e.g., an EJS template), the PDF generation system 104 compiles the EJS template and applies the data from the request payload to produce an HTML output (Step 214). This resulting HTML is then rendered by the browser automation tool (Step 208) and converted into a PDF buffer (Step 210), which is then saved in the non-transitory memory as the PDF document, after which the process ends (Step 212).

If the content type is a URL, the browser automation tool navigates to the specified URL in a headless browser environment and renders a webpage (Step 218). Once the webpage is fully rendered, the browser automation tool uses the browser's native print-to-PDF functionality to generate a PDF buffer (Step 210), and the process concludes (Step 212).

In an alternative implementation variant, when the content type is a URL, the PDF generation system 104 may alternatively first navigate to the webpage using a browser automation tool (Step 216), then extract and process the HTML content (Step 220), and subsequently render and convert the extracted HTML to a PDF (Steps 208-212).

It should be noted that FIG. 2 merely provides one example of the process flow. In an alternative variant for example, rather than relying on the approach shown, the PDF generation system 104 may sequentially check each potential content type until it finds a match. For example, the system could first determine whether the input corresponds to one type, and if not, then check whether it corresponds to a different type, and if still not found, proceed to check whether it corresponds to a third type, etc.

Having described how the system 100 can be configured to generate PDF documents from a URL, HTML content, or a Dynamic Content template, there may be instances where multiple content segments are needed to be processed into a merged PDF document.

Below is a representative example of a merge request payload for inputs of HTML, URL, and Dynamic Content Template in which a set of configurations can be defined for the PDF generation system 104 followed by a parenthetical indicating the details of what may be included in that field. In this example, the merge request payload includes a "report" object, having a "fileName" field in which a corresponding value specifies the name under which a resulting PDF document will be saved. A "files" array also exists within the merge request payload and contains an object, having a "content" array. The "content" array contains at least two content objects, each corresponding to a content segment. The at least two content objects may specify one of several content types (e.g., "html", "url", or "dynamicContent") along with the corresponding value (e.g., raw HTML markup, a URL referencing a web page, or a EJS configuration):

```
{
  "report": {
    "fileName": (Will include the name of the generated PDF)
  },
  "files": [
    {
      "content": [
        {
          "html": "<h1>HTML Content will Go Here</h1>"
        },
        {
          "url": "http://wiki-na.ms.com/Elysia"
        },
        {
          "dynamicContent" :                {
            "Format ": "ejs",
            "template": "This is Dynamic Template.
  <h1><%= header %></h1>",
            "data": {
              "header":  "Dynamic  Header"
            }
          }
        }
      ]
    }
  ]
}
```

Figure 3:
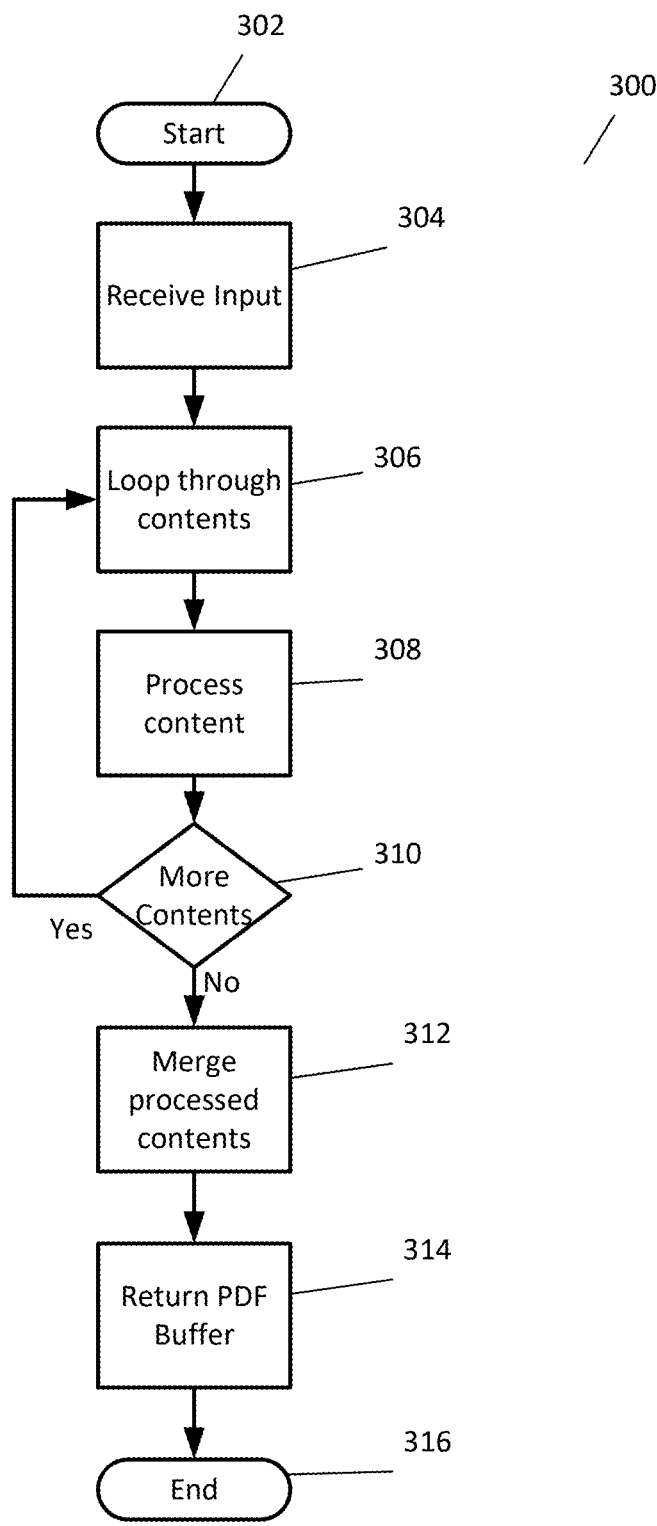
FIG. 3 illustrates, in simplified from, a flowchart for a representative example process for merging multiple PDF documents within the PDF generation system, initiated by a request from the user and executed by the processor of the system in accordance with the teachings herein.

FIG. 3 illustrates, in simplified from, a flowchart 300 for a representative example process for merging multiple PDF documents within the PDF generation system 104, initiated by a request from the user 106 and executed by the processor 110 of the system 100 in accordance with the teachings herein.

The process begins (Step 302) when the PDF generation system 104 receives an input (Step 304) of the merge request payload as shown above. The system iterates through each content object found within the "content" array (Step 306).

Within each iteration of the loop, the system checks the type of content (e.g., "html", "url", or "dynamicContent") and process it accordingly as discussed in connection with FIG. 2. The outcome is a PDF buffer that corresponds to a content segment (Step 308).

The PDF generation system 104 checks after each iteration of the loop to see if additional content objects exist in the "content" array (Step 310), if yes, the process iterates back to Step 306. The same procedures of Steps 306-310 are repeated until no more content objects remain to be processed. Once every content object has been converted into a PDF buffer, the PDF generation system 104 proceeds to a merging phase. During this phase, all PDF buffers generated in the previous steps are combined and processed to produce the merged PDF document (Step 312), the PDF buffer is returned (Step 314) and the process ends (Step 316).

One implementation of the merging phase involves the PDF generation system 104 making an empty PDFDocument object (an object that represents an entire PDF document, allowing you to create, modify, or read its pages and contents, using for example, pdf-lib library which can be found at https://pdf-lib.js.org/docs/api/classes/pdfdocument). An empty array is also created that to store arrays of PDFPage objects (an object that represents a single page in a PDF document that can be modified or from which content can be extracted, for example, using PDFPage of the pdf-lib library and can be found at https://pdf-lib.js.org/docs/api/classes/pdfpage). The PDF generation system 104 then takes all of the PDF buffers generated in the previous steps and for each of them, converts them into a PDFDocument object, retrieves an array of PDFPage objects from the PDFDocument object, and inserts them into the empty array. The result is the empty array is filled with arrays of PDFPage objects, with each array representing a content segment. Finally, the PDF generation system 104 adds each of the PDFPage objects within the arrays of PDFPage objects to the empty PDFDocument object, and a merged PDF buffer is created using the now filled PDFDocument object. The resulting merged PDF buffer is then returned by the PDF generation system 104 to the user 106 (the merged PDF buffer is converted to the merged PDF document when saved to the non-transitory memory 112 or opened in a PDF viewer).

Having described how the system 100 can be configured to generate a merged PDF documents from multiple content segments, there may be instances where multiple content segments are needed to be processed into a set of separate PDF documents (merged or stand-alone PDF documents) in one go.

Below is a representative example of a mutli-content request payload for inputs of HTML, URL, and Dynamic Content Template in which a set of configurations can be defined for the PDF generation system 104, followed by a parenthetical indicating the details of what may be included in that field. In this example, the multi-content request payload includes a "report" object, having a "fileName" field in which a corresponding value specifies the name under which a resulting ZIP file will be saved and a "fileType" field in which a corresponding value specifies the file type of the output (ZIP format in this instance). A "files" array also exists within the multi-content request payload and contains at least two objects, each having a "content" array. Each "content" array contains one or more content objects, each corresponding to a content segment. The one or more content objects may specify one of several content types (e.g., "html", "url", or "dynamicContent") along with the corresponding value (e.g., raw HTML markup, a URL referencing a web page, or a EJS configuration):

```
{
  "report": {
      "fileName": (Will include the name of the generated ZIP file)
      "fileType": "zip"
  },
  "files": [
      {
          "fileName": (for individual filename of PDF document)
          "content": [
              {
                  "html": "<h1>HTML Content will Go Here</h1>"
              },
              {
                  "url": "http://wiki-na.ms.com/Elysia"
              }
          ]
      },
      {
          "fileName": (for individual filename of PDF document)
          "content": [
              {
                  "url": "http://wiki-na.ms.com/Elysia"
              }
          ]
      }
  ]
}
```

Figure 4:
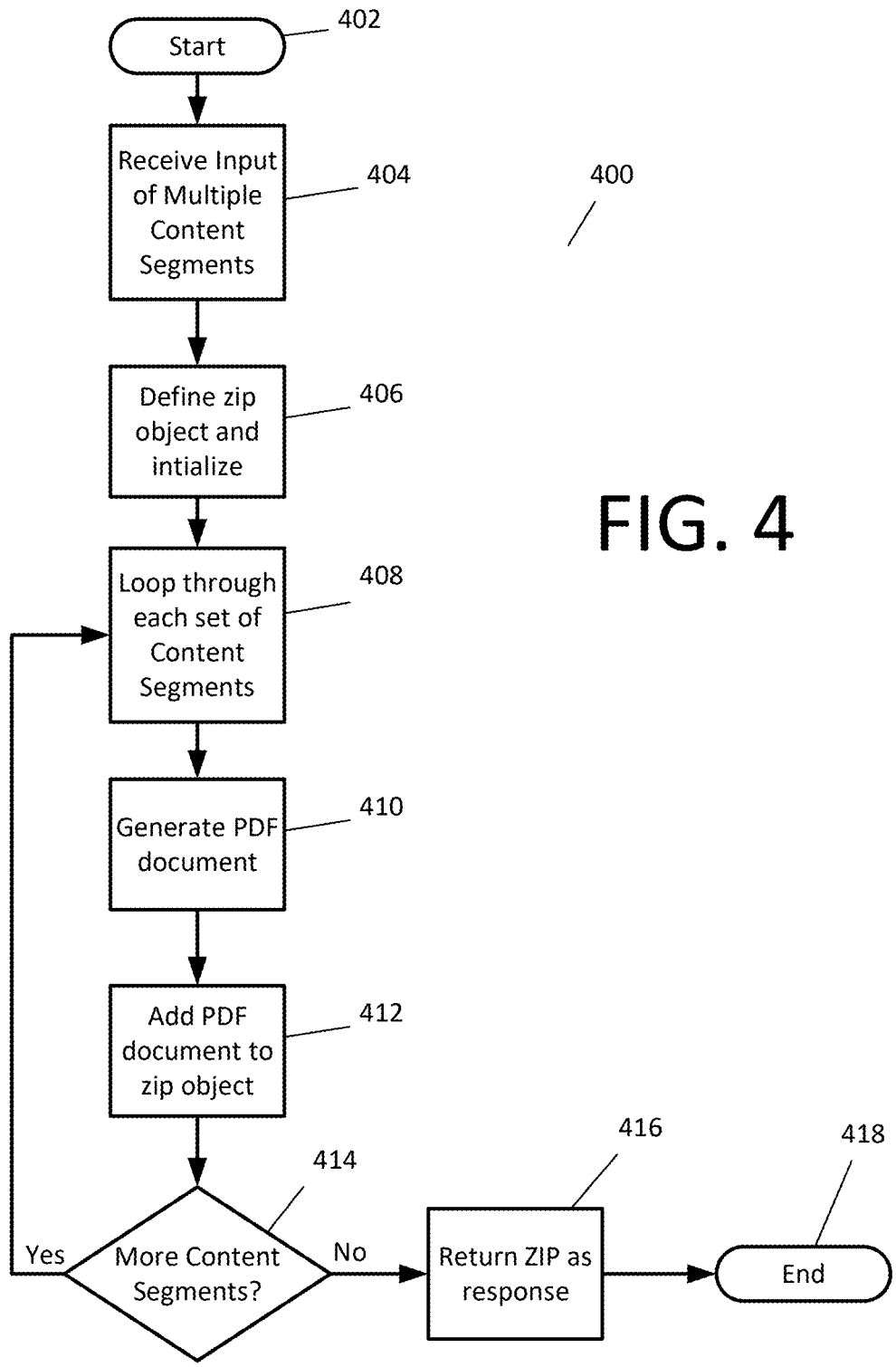
FIG. 4 illustrates, in simplified form, a flowchart for a representative example process for handling multiple content segments within a single request, generating multiple PDF documents, and bundling them into a ZIP file within the PDF generation system, initiated by a request from the user and executed by the processor of the system in accordance with the teachings herein.

FIG. 4 illustrates, in simplified form, a flowchart 400 for a representative example process for handling multiple content segments within a single request, generating multiple PDF documents, and bundling them into a ZIP file within the PDF generation system 104, initiated by a request from the user 106 and executed by the processor 110 of the system 100 in accordance with the teachings herein.

The process begins (Step 402) when the PDF generation system 104 receives an input (Step 404) of the multi-content request payload as shown above. The system reads the "fileType" value within the "report" object, in which after determining the "zip" value, creates or initializes an in-memory ZIP object (for instance, via AdmZip) (Step 406).

The PDF generation system 104 then loops through each object in the "files" array (Step 408). For each object, a PDF document is generated by processing the "content" array and its content object similar to the procedure described in connection with FIG. 2 (Step 410). And if there are more than one content objects within the "content" array, a merged PDF document is generated similar to the procedure described in connection with FIG. 3 (Step 410).

Once the PDF document or merged PDF document is generated for the current object object, the PDF generation system 104, adds the resulting PDF document into the ZIP object (Step 412).

The PDF generation system 104 checks whether any additional objects exist within the "files" array (Step 414). If more objects exist, the flow returns to steps 408-410 to generate another PDF document. If no further objects remain, the process moves toward forward and the PDF generation system 104 creates a ZIP buffer (converts to a ZIP file when received by a user) using the ZIP object and returns it as a response (Step 416) and saved in the non-transitory memory 112. The process concludes (Step 418).

In an alternative implementation variant, the system might skip ZIP creation if "fileType" is missing or defaults to "pdf". Instead, it could merge all content from the "files" array into a single PDF document.

Having described how the system 100 can be configured to generate PDF documents, from content segments, there may be instances where pre-existing PDF documents are needed to be fetched and merged into generated or to-be generated PDF documents in one go.

Below is a representative example of a fetch-merge request payload for inputs of HTML, URL, and Dynamic Content Template along with inputs of a pre-existing PDF document pointed to either by a URL, or a file path on a Network-attached-storage (NAS), in which a set of configurations can be defined for the PDF generation system 104 followed by a parenthetical indicating the details of what may be included in that field. In this example, the fetch-merge request payload includes a "report" object, having a "fileName" field in which a corresponding value specifies the name under which a resulting PDF document will be saved. A "files" array also exists within the multi-content request payload and contains an object, having a "content" array. The "content" array contains one or more content objects, where at least one of the one or more content objects corresponds to the pre-existing PDF document, and the rest corresponding to one or more content segment. The one or more content objects may specify one of several content types (e.g., "html", "url", "dynamicContent", or "pdf") along with the corresponding value (e.g., raw HTML markup, a URL referencing a web page, a EJS configuration, or a URL/file path to the pre-existing PDF document):

```
{
  "report": {
      "fileName": (Name of the file)
  },
```

```
            "files": [
                {
                    "content": [
                        {
                            "pdf": (file path| URL)
                        }
                    ]
                }
            ]
        }
```

Figure 5:
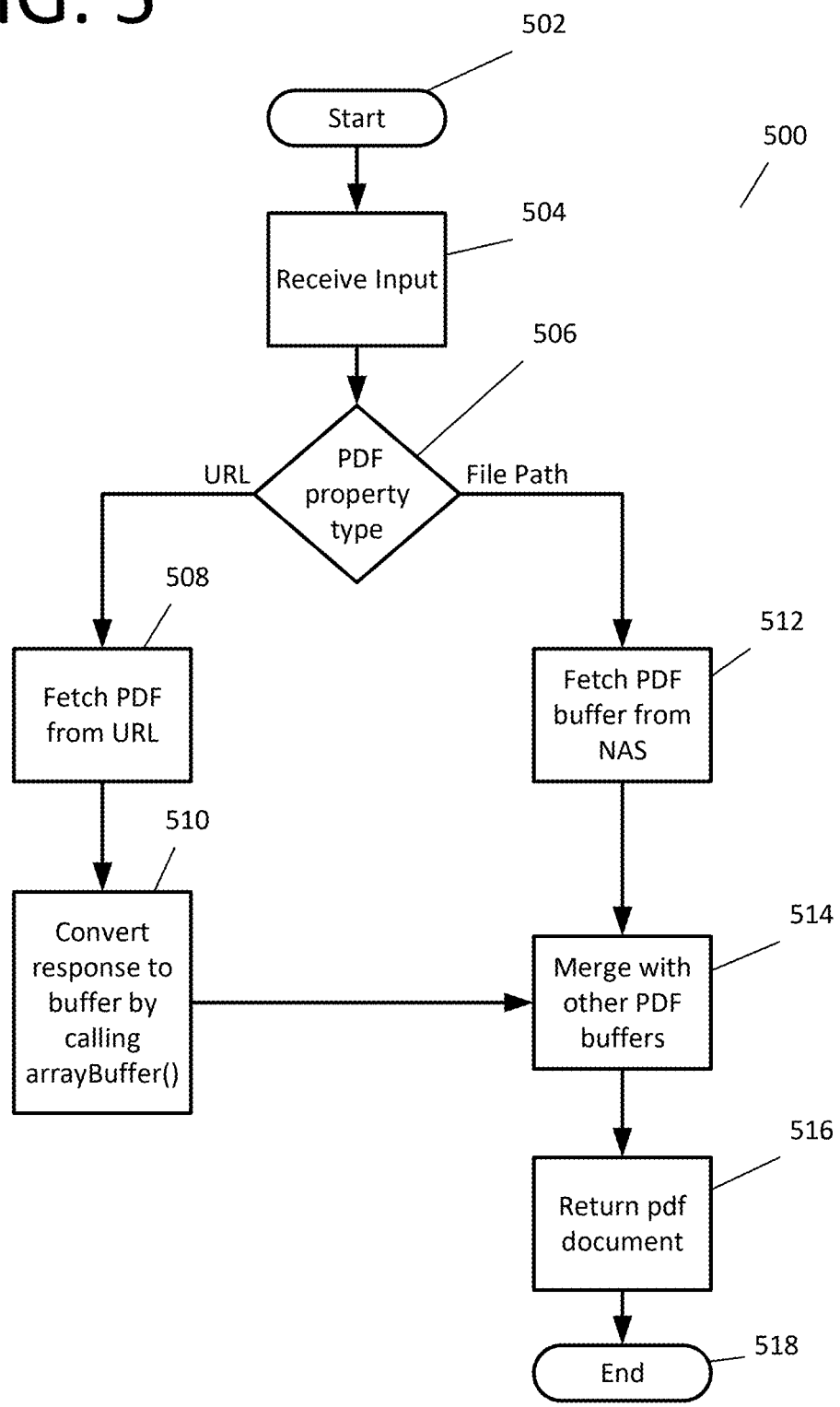
FIG. 5 illustrates, in simplified form, a flowchart for a representative example process for merging either a pre-existing PDF document pointed to by a URL or a file path on a NAS with one or more generated or to-be generated PDF documents within the PDF generation system, when initiated by a request from the user and executed by the processor of the system in accordance with the teachings herein.

FIG. 5 illustrates, in simplified form, a flowchart 500 for a representative example process for merging either a pre-existing PDF document pointed to by a URL or a file path on a NAS with one or more generated or to-be generated PDF documents within the PDF generation system 104, when initiated by a request from the user 106 and executed by the processor 110 of the system 100 in accordance with the teachings herein.

The process begins (Step 502) with the PDF generation system 104 receiving an input (Step 504) of a fetch-merge request payload such as above. The "content" array of the request payload is then examined (Step 506) in the PDF generation process and if a "pdf" field is encountered in a content object, the PDF generation system then determines whether the value of the "pdf" field is a URL or a file path to a pre-existing PDF document on a NAS.

If the value of the "pdf" field is a URL, the PDF generation system 104 fetches the PDF document from the address pointed to by the URL (Step 508). An example way this can be accomplished is by the PDF generation system 104 calling a fetch( ) method and passing the URL as an argument. When the URL is passed, the fetch( ) method goes to the address pointed to by the URL (usually a website or local pathway) and requests data (e.g., HTML documents or JSON objects) specified by the payload. Once the requested data is retrieved, it will then be stored in a response object to temporarily hold the data. The response object is then converted into an PDF buffer (Step 510) by calling an arrayBuffer( ) function onto the response object. The PDF buffer can then be used, in conjunction with other PDF buffers generated by the PDF generation system 104, to create a merged PDF document in a manner similar to the procedure described in connection with FIG. 3 (Step 514). The merged PDF document is then returned as a response (Step 516) and saved in the non-transitory memory 112, and the process ends (Step 518).

If the content type is identified as a file path to a PDF document on a NAS, the PDF generation system 104 fetches the PDF document from the address pointed to by the URL (Step 512). For example, by the PDF generation system 104 calling a readFile( ) method (the promise-fs library which can be found at https://www.npmjs.com/package/promise-fs) and passing the file path as the argument. The response from the readFile( ) method will be a PDF buffer, which can then be used in conjunction with other PDF buffers generated by the PDF generation system 104 to create a merged PDF document similar to the procedure described in connection with FIG. 3 (Step 514). The merged PDF document will then be returned as a response (Step 516) and the process ends (Step 518).

It should be noted that the functions described above and are provided solely as an example. Other implementation variants could use different functions to achieve the same result.

Now there may be instances where, while generating a PDF document from multiple content segments, a table of contents would be advantageous to have in order to allow a viewer of the PDF document to navigate to different sections of that PDF document corresponding to a particular content segment.

Below is a representative example of a table of contents request payload for inputs of an HTML, URL, Dynamic Content Template, along with a pre-existing PDF document pointed to either by a URL, or a file path on a Network-attached-storage (NAS), and table of contents template in which a set of configurations can be defined for the PDF generation system 104 followed by a parenthetical indicating the details of what may be included in that field. In this example, the table of contents request payload includes a "report" object, having a "fileName" field in which a corresponding value specifies the name under which a resulting table of contents PDF document will be saved. A "files" array also exists within the table of contents request payload and contains an object, having a "content" array. The "content" array includes a table of contents object and one or more content objects. The table of contents object corresponds to the table of contents page by having a "contentType" field that specifies a "toc" value. The one or more content objects correspond to one or more content segments that will be processed and merged with a table of contents page by the PDF generation system 104. The at least one or more content objects includes a "tocConfig" field that specifies further configurations for each content object. In this example the "label" specifies a title for the corresponding content object. The at least one or more content object also includes a field that corresponds to a content type (e.g., "html", "url", "dynamicContent", or "pdf") along with the corresponding value (e.g., raw HTML markup, a URL referencing a web page, a EJS configuration, or a URL/file path to the pre-existing PDF document):

```
{
    "report": {
        "fileName": "toc-pdf"
    },
    "files": [
        {
            "content": [
                {
                    "html": "<h1>TOC Placeholder (Custom TOC) </h1>",
                    "contentType": "toc"
                },
                {
                    "html": "<h1>Coverpage</h1>",
                    "tocConfig": {
                        "label": "Coverpage"
                    }
                },
                {
                    "html": "Page 1",
                    "tocConfig": {
                        "label": "Page 1"
                    }
                },
                {
                    "html": "Page 2",
                    "tocConfig": {
                        "label": "Page 2"
                    }
                },
```

```
        {
            "html": "Page 3",
            "tocConfig": {
                "label": "Page 3"
            }
        }
      ]
    }
  ]
}
```

Figure 6:
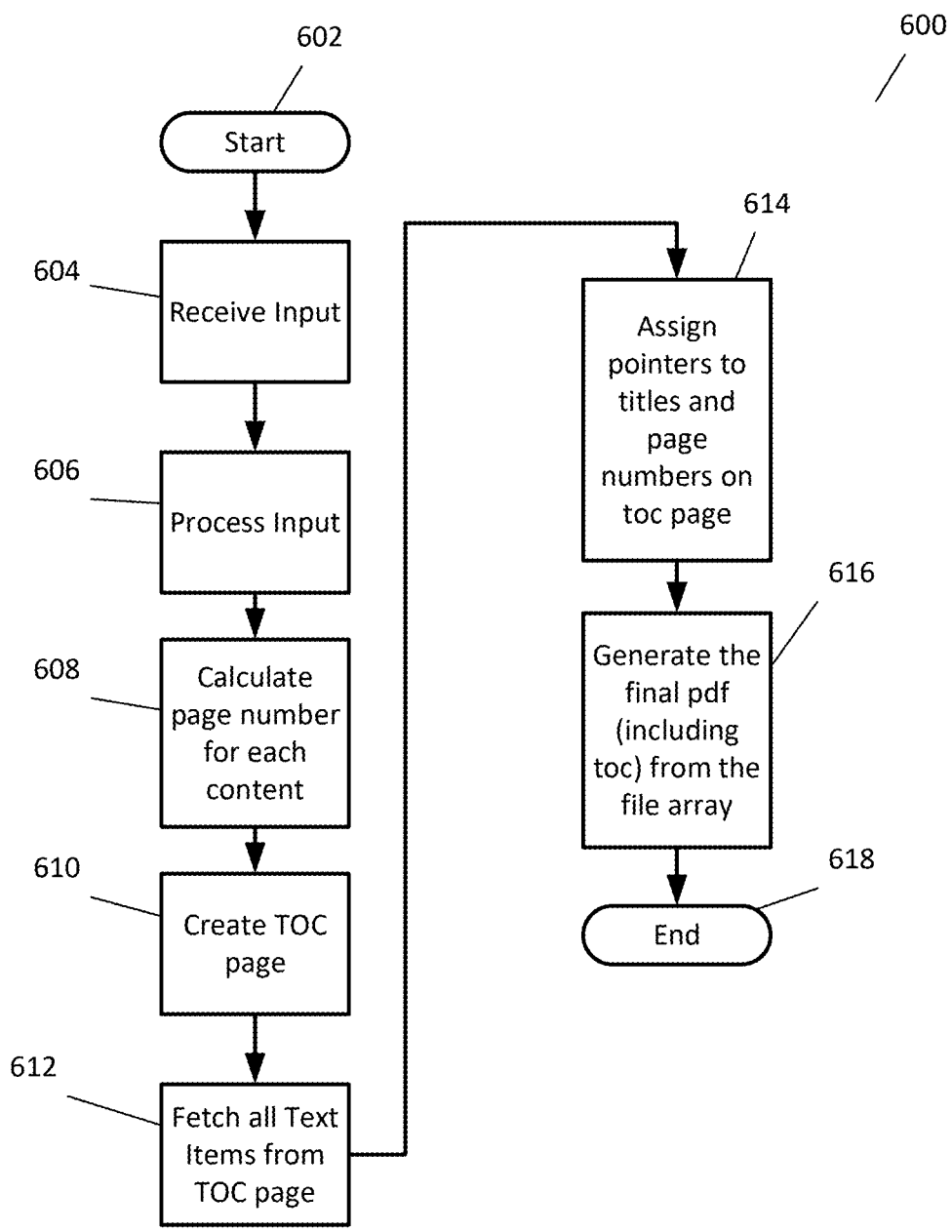
FIG. 6 illustrates, in simplified form a flowchart for a representative example process for generating a PDF document with a table of contents within the PDF generation system, initiated by a request from the user and executed by the processor of the system in accordance with the teachings herein.

FIG. 6 illustrates, in simplified form a flowchart 600 for a representative example process for generating a PDF document with a table of contents within the PDF generation system 104, initiated by a request from the user 106 and executed by the processor 110 of the system 100 in accordance with the teachings herein.

The process begins (Step 602) when the PDF generation system 104 receives an input of a table of contents request payload described in connection with the code and description above (Step 604).

In some implementations, an array is created by the PDF generation system 104 to organize and structure a table of contents page, although the use of an array is not required, any other form(s) of data organization can be used, the important point being the data available, not the manner in which it is organized. For purposes of explanation and simplicity, an array is used here. The array is referred to herein for purposes of understanding as a "tocContent array."

FIG. 7 is a simplified overview of one representative example of a tocContent array 700. The tocContent array 700 holds a dummy object 702 and a set of content data objects (704-1, 704-2, . . . 704-n), with each content data object (704-1, 704-2, . . . 704-n) containing at least a title, a page number, and a page count.

In some implementations, another array can also be created by the PDF generation system 104 to enable efficient management of a document's segmented content. For purposes of explanation, this array is referred to herein as a "FileArrayOfPages array."

Figure 8:
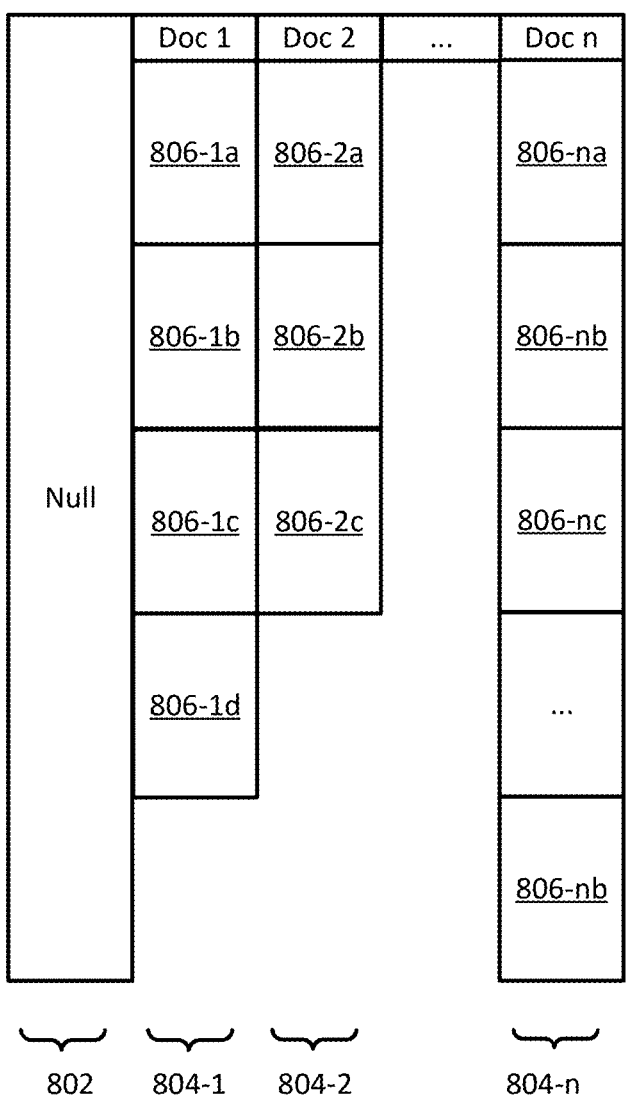
FIG. 8 illustrates, in simplified form, a representative overview of a "FileArrayOfPages" array in accordance with the teachings herein.

FIG. 8 is a simplified overview of one representative example of a FileArrayOfPages array 800. The FileArrayOfPages array 800 holds a null 802 and a set of PDFpage arrays (804-1, 804-2, . . . 804-n), where each PDFpage array (e.g., 804-1) will hold of a set of PDFpage objects (e.g., 806-1a, 806-1b, 806-1c, 806-1d for PDFpage array 804-1, 806-2a, 806-2b, 806-2c for PDFpage array 804-2 and 806-na, 806-nb,806-nc, . . . for PDFpage array 804-n). Each PDFpage array 804 represents all pages of a PDF document corresponding to a content segment and each PDFpage object 806 represent one page of the all pages of that PDF document.

In some implementations, a helper PDFDocument object may also be created by the PDF generation system 104 to help assemble and manage a final PDF document. The helper PDFDocument object facilitates operations such as adding pages, merging content, and applying formatting to ensure a cohesive and properly structured output.

Although the foregoing description references the tocContent array 700 and the FileArrayOfPages array 800 in conjunction with PDFPage objects from the pdf-lib library, these specific data structures and libraries are merely examples of one way to organize and manipulate the relevant information. Other data structures and code libraries could equally be employed to achieve the same or substantially similar functionalities. The core concept lies in capturing and managing content segments and their associated metadata, rather than the use of any particular software tool.

With continuing reference to FIGS. 2, 4 and 6-8, the process for merging PDFs and creating a table of contents will now be explained.

The PDF generation system 104 loops through and processes the "content" array of the table of contents request payload (Step 606) to process the one or more content objects within to create a PDF buffer for each content object passed. The PDF generation system 104 reads the "tocConfig"/"contentType" fields of each content object and a corresponding value to the field along with an index of each content object derived from the position of the corresponding content object within the "content" array.

In some implementations, If the table of contents object is passed, a dummy object 702 is inserted into the tocContent array 700 and a null 802 is inserted to the FileArrayOfPages array 800. The null 802 is used to indicate a placeholder to be replaced after processing the table of contents page separately.

In some implementations. If a content object is passed, the content object is processed accordingly, similar to the procedure described in connection with FIG. 2 if the type of content is of "html", "dynamicContent", or "url", or to the procedure described in connection with FIG. 4 if the type of content is of "pdf", with the result being a PDF buffer that is then converted into a PDFDocument object that represents a final PDF document of the content object. Using the PDFDocument object, an PDFpage array 804 that includes a set of PDFpage objects 806 can be obtained. The PDFpages array 804 is pushed to the FileArrayOfPages array 800. A content data object 704 is created using the PDFDocument object and is inserted within the tocContent array 700 at a same index in which the content object is positioned within the "content" of the table of contents request payload. The page number of the content data object at this stage will be a placeholder value, as a true value will be calculated later once each content object and the table of contents object has been processed. Although a PDFDocument object (from the pdf-lib library) is used in this example, any equivalent data structure or library that provides similar PDF manipulation capabilities could be employed. The essence lies in the ability to create and manage PDF documents, rather than reliance on a specific library or code implementation.

Once the table of contents object and each content object has been processed, the result is the FileArrayOfPages array 800 now filled with the null 802 at a position where the table of contents object will be processed and a set of PDFpage arrays (804-1, 804-2, . . . 804-n) in which each PDFpages array 804 represents a content object from the "content" array of the table of contents request payload. The tocContent array 700 is also now filled with the dummy object 702 and a set of content data objects (704-1, 704-2, . . . 704-n) with each content data object 704 containing at least a title, a number of pages value, and a placeholder page number value about a content object.

In some implementations, the PDF generation system 104 employs a numbering process to calculate a true page number for and replace the placeholder page number value of each content data object 704 from the tocContent array 700 (Step 608). A counter is created with an initial value of one to help calculate the page number of each content data object 704. The numbering process 104 loops through the tocContent array 700 and for each iteration, will set the page number of a current content data object as the value of the counter and increment the value of the counter by the page count of the current content data object.

In some implementations, the PDF generation system 104 employs a table of contents template process to create the table of contents page by using a custom template in the form of HTML markup or URL address, or a default template (Step 610).

If the custom template is used for the table of contents template process, a table of contents list template is created using the tocContent array 700 in the form of a template literal, containing information such as author and page number pulled from the tocContent array 700. The table of contents list template is then represented as a HTML markup. The table of contents template process will read the content type of the table of contents object.

If a URL is passed within the custom template, one example handling of the URL would involve the table of contents object including an additional "tocConfig" field in which a "containerSelector" property is defined within. The "containerSelector" property would represent a Cascading Style Sheet ("CSS") selector that points to an element in a HTML markup. The table of contents template process would load the URL within a headless browser environment onto a webpage using a browser automation tool (for example Puppeteer as described above) and make an attempt to read the "containerSelector" property from the "tocConfig" field of the table of contents object. If the "containerSelector" property is passed, the PDF generation system 104 will inject the table of contents list template in an element within the webpage that corresponds to the "containerSelector" property. If the "containerSelector" property is not passed, the table of contents template process will inject the table of contents list template in a body element of the webpage. Then a table of contents PDF buffer is generated using a browser automation tool to invoke the browsers native print-to-pdf function.

If an HTML markup is passed within the custom template, one example way of handling the HTML markup would involve (using Puppeteer in this example) creating a Puppeteer page object (found at https://pptr.dev/api/puppeteer-.page), and setting the HTML markup as a content of the Puppeteer page object using the setContent( ) method native to the Puppeteer page object. The table of contents list template would then be injected in a body element of the content of the Puppeteer page object by calling the evaluate( ) method native to the Puppeteer page object. A table of contents PDF would then be generated using, for example, Puppeteer's native pdf( ) method.

If a default template is passed for the table of contents template process, one example way of handling the default template would involve the table of contents template process retrieving a file path for a pre-defined EJS template and a file path for a pre-defined CSS. Using the EJS renderFile( ) method (from the EJS library found at https://ejs.co/) and the tocContent array 700, the PDF generation system 104 generates a table of contents HTML markup. The table of contents HTML markup would then be loaded onto a Puppeteer page object within a headless browser environment using Puppeteer's setContent( ) method. Finally, the CSS styling is applied to the Puppeteer page object using Puppeteer's addStyleTag( ) method. A table of contents PDF buffer is finally generated using Puppeteer using the process as discussed in connection with FIG. 2.

The default template and the custom template being passed in the table of contents template process results in a table of contents PDF buffer representing the table of contents page.

In some implementations, the PDF generation system 104 may also employ a parsing process to create an array to enable accurate tracking of title text and page number text residing on each page of the table of contents PDF buffer (Step 612). For purposes of explanation, the array is referred to herein as a "tocPagesWithTextItems array."

FIG. 9 is a simplified overview of one representative example of a tocPagesWithTextItems array 900. The tocPagesWithTextItems array 900 holds a set of TextItem object arrays (902-1, 902-2, . . . , 902-*n*), where each TextItem object array (e.g, 902-1) holds a set of TextItem objects (e.g, 904-1*a*, 904-1*b*, 904-1*c*, 904-1*d* for TextItem object array 902-1, 904-2*a*, 904-2*b*, 904-2*c*, 904-2*d* for TextItem object array 902-2 and 904-*na*, 904-*nb* for TextItem object array 902-*n*). Each of TextItem object 904 will include at least a text representing the title or the page number of a content object, a x coordinate and a y coordinate representing the position of the text on a PDF page (906-1, 906-2, . . . 906-*n*), and a width and a height representing how much horizontal and vertical space the text occupies on the particular PDF page 906. The primary purpose of using TextItem objects 904 (from the pdfjs-lib and found at https://mozilla.github-b.io/pdf.js/api/draft/module-pdfjsLib.html) is to simplify the process of identifying and manipulating specific text elements on the PDF page. This allows efficiency in organizing and formatting textual content, such as dynamically generating a table of contents. However, it is important to note that the invention is not limited to the use TextItem objects 904, alternative library, tool, or custom implementation that provides similar functionality could be used to achieve the same result. These tools merely facilitate the process but are not required. Each TextItem object array 902 will contain a same number of TextItem objects 904—representing a same or maximum number of titles or page number text that can fit in a single table of contents page—except potentially the last TextItem object array 902-*n*, which may contain fewer entries, if there are fewer than would fully occupy the final page.

One implementation of the parsing process involves passing the Table of contents PDF buffer and the tocContent array 700 to the parsing process. The parsing process processes the table of contents PDF buffer to generate a set of TextItem object arrays (902-1, 902-2, . . . 902-*n*), with each TextItem object array 902 corresponding to a page of the table of contents PDF buffer.

The process begins by creating a DocumentInitParameters object (contains configuration options, such as the URL, binary data, or password, used to load and initialize a PDF document. From the pdfjs-lib library and can be found at https://mozilla.github.io/pdf.js/api/draft/module-pdfjsLib.html) and converting the table of contents PDF buffer into a Unit8Array. The Unit8Array is then assigned to a data property of the DocumentInitParameters object. The parsing process proceeds by invoking a getDocument( ) method (from pdfjs-lib) and passing the DocumentInitParameters object as a argument, which returns a PDFDocumentProxy object (which represents a loaded PDF document, providing methods to access its metadata, pages, and other document-level information) The PDFDocumentProxy object includes a set of pages, where each page of the set of pages represents a distinct page of the table of contents PDF buffer.

The parsing process creates the tocPagesWithTextItems array 900 by iterating over the set of pages of the PDFDocumentProxy object by calling the getPage( ) method (from pdf-lib) for each page of the set of pages, with the input being an index for each page, and the result being an page object that represents a current page. The parsing process then invokes the getTextContent( ) method (from pdfjs-lib) on the page object, which produces a TextItem object array (e.g. 902-1) holding a set of TextItem objects (e.g. 904-1*a*, 904-1*b*, 904-1*c*, 904-1*d*). Each TextItem object (e.g. 904-1*a*, 904-1*b*, 904-1*c*, 904-1*d*) includes a text, a x coordinate, a y coordinate, a height, and a width of a distinct text on the current page. At the end of the iteration, the TextItem object array 902-1 is added to the tocPagesWithTextItems array 900.

Once each page of the set of pages of the PDFDocumentProxy object have been processed, the tocPagesWithTextItems array 900, now filled with a set of TextItem object arrays 902, is filtered by the parsing process to retain only the TextItem objects 904 with texts that match to the title or the page number of a content data object of the tocContent array 700.

The result is the tocPagesWithTextItems array 900 filled with a set of TextItem object arrays (902-1, 902-2, . . . 902-*n*), with each TextItem object array 902 representing a distinct page of the table of contents PDF buffer, and each TextItem object corresponding to a distinct title or a distinct page number on the distinct page of the table of contents PDF buffer.

In some implementations, the PDF generation system 104 employs pointer establishment to enable navigation within a table of contents PDF document by creating and adding link annotations to a set of relevant text items (Step 614).

One implementation of the pointer establishment involves the PDF generation system 104 creating a table of contents PDFDocument object from the table of contents PDF buffer. The pointer establishment process receives, as inputs, the table of contents PDFDocument object, the tocPagesWithTextItems array 900, and the tocContent array 700. The pointer establishment process would then iterate through the tocPagesWithTextItems array 900 and for each iteration, loops through a current TextItem object array (e.g., 902-1) of the tocPagesWithTextItems array 900 to process a current set of TextItem objects (e.g., 904-1*a*, 904-1*b*, 904-1*c*, 904-1*d*). The pointer establishment process would then process each TextItem object (e.g., 904-1*a*, 904-1*b*, 904-1*c*, 904-1*d*) by identifying those that correspond to a distinct title of a content data object 704 and correlate the distinct title with a respective page number of the content data object 704. The pointer establishment process would then calculate a region that spans from a bottom-left coordinates of the distinct title (obtained from the transform[4] and transform[5] properties of a TextItem object that represent the x (horizontal) and y (vertical) positions of the title.) to a top-right coordinates of the respective page number (derived by adding the width and the height of text item object that represents a page number).

The region defines a clickable link area that will navigate a viewer to an indicated page. In constructing the clickable link area, the pointer establishment process would create a link annotation object (a native PDF feature) for each iteration through the text item array. The link annotation object includes a Rect property and Dest property, in which the Rect property is set to the bottom-left coordinates and the top-right coordinates of the region, and the Dest property is set to the respective page number. The link annotation object is stored in a PDFDict objects array (provided by pdf-lib).

After the pointer establishment process processes the current set of TextItem objects (e.g., 904-1*a*, 904-1*b*, 904-1*c*, 904-1*d*), the result is the PDFDict objects array is filled with a set of link annotation objects corresponding to the current set of TextItem objects (e.g., 904-1*a*, 904-1*b*, 904-1*c*, 904-1*d*). The pointer establishment process then iterates over the PDFDict objects array and for each iteration, a current link annotation object is registered to a context object of the table of contents PDFDocument object, and a key-value pair is set in a PDF dictionary object of the PDFDocument object with "Annots" as the key and the PDFDict objects array as the value.

After the pointer establishment process finishes iterating through the PDFDict objects array, the pointer establishment process will begin looping through a next TextItem object array (e.g., 902-2) of the tocPagesWithTextItems array 900, until the set of TextItem object arrays 902 have all been processed.

The pointer establishment process outputs the table of contents PDFDocument object, which now includes a set of registered link annotations, allowing readers of a final PDF document to simply click a title or a page number that is encompassed by a corresponding region to directly navigate to a respective page indicated thereby.

In some implementations, the PDF generation system 104 can also employ a merging process to combine the table of contents page with the content segments.

One example of the merging process involves taking as inputs the table of contents PDFDocument object and converting it into a table of contents PDFpages array. Then the merging process would replace the null of the FileArrayOfPages array and flatten the FileArrayOfPages 800. The FileArrayOfPages 800 would then be looped through so that each PDFpage object of the the FileArrayOfPages 800 would be added to the helper PDFDocument object by calling the addpage( ) method of the helper PDFDocument object. The helper PDFDocument object would finally be converted to a final PDF buffer which could then be returned to the user 106 (the final PDF buffer is converted to the PDF document with a table of contents when saved in the non-transitory memory 112 or opened in a PDF viewer) (Step 616), and the PDF generation process ends (Step 618).

There may be instances where, while generating a PDF document from multiple content segments, calculating and drawing a page number for each page of the PDF document would be advantageous.

By way of example, we will expand upon the processed discussed in FIG. 6.

One variant implementations for drawing a page number for each page of the PDF document with a table of contents involves creating a counter with an initial value of 1 and iterating through the flatten FileArrayOfPages 800 and for each PDFpage object, using a drawText( ) method (apart of PDFpage object) with the value of the counter and a configuration object as arguments. The counter would then incremented by one each time invoking the drawText( ) method.

The configuration object can contain options that can determine certain aspects before the page number is drawn, such as position, size, and color.

The remainder of the process proceeds in accordance with FIG. 6, culminating in the PDF document with a table of contents having a page number text on each page, thereby providing better navigability and clarity for users.

Additionally, advanced properties like "appendTimeStamp", "location", or "pdfOptions" could be leveraged to modify how each file's PDF document is created, where it is stored, and how it is named upon final packaging into either a single PDF document or a ZIP file containing multiple PDF documents.

It will now be appreciated that all of the foregoing processes will ultimately result in creation of a PDF document 108 that can be viewed by a user 106 via the UI 102.

It should be understood that the foregoing sample payloads and pseudocode are provided merely as illustrative examples and are not limiting on the invention defined by the appended claims or equivalents thereto. In alternative or additional implementations, more complex options, user-defined configurations, or further advanced parameters may be employed to refine file outputs, rendering processes, or other system functionalities. By way of non-limiting example, the user 106 may choose to include the "fileType" field within the "report" object as either "pdf" or "zip," potentially merging multiple PDFs into one file or packaging them individually into a ZIP archive. Similarly, the "fileName" field may be specified at the "report" level to define the primary output file name (PDF or ZIP), or within each individual file object in the "files" array to produce separately named PDFs that may then be combined into a ZIP.

Moreover, additional properties such as "appendTimeStamp," "location," "pdfOptions," "pageOptions," and "urlsToAuthenticate" can be included, either under the "report" object or under any object in the "files" array, to enable more specialized behavior (e.g., appending timestamps to filenames, storing outputs at network paths, adjusting page scaling, waiting for DOM selectors, or handling authentication flows). The sample payloads and logic flows herein are thus intended to illustrate the general structure and usage of these configurations. The user 106 may adapt and expand these examples in numerous ways to accommodate different output formats, specialized user requirements, or operational constraints, without departing from the teachings set forth herein.

The foregoing outlines, generally, the features and technical advantages of one or more implementations that can be constructed based upon the teachings in this disclosure in order that the foregoing detailed description may be better understood. However, the advantages and features described herein are only a few of the many advantages and features available from representative examples of possible variant implementations and are presented only to assist in understanding. It should be understood that they are not to be considered limitations on the invention as defined by the appended claims, or limitations on equivalents to the claims. For instance, some of the advantages or aspects of different variants described herein and may be mutually contradictory, in that they cannot be simultaneously present in a single embodiment. Similarly, some features or advantages may be applicable to one aspect and inapplicable to others. Thus, the foregoing features and advantages should not be considered dispositive in determining equivalence. Additional features and advantages, although not detailed herein, will be apparent from the teachings of the description, drawings, and claims.

What is claimed is:

1. A method for creating a merged navigable PDF document, the method comprising:
   receiving an input comprising at least two content segments, each content segment, of the at least two content segments, having a corresponding data structure including at least a title, a page count value, and a page number value;
   determining, for each data structure, the page number value by adding together
      an initial value of one,
      an offset corresponding to a total number of table of contents pages, and
      a total sum of the page counts of any previously processed content segments, unless no previously processed content segments exist, in which case, the total sum of the page counts is used as zero;
   generating a set of table of contents pages with the title and the page number value of each content segment, of the at least two content segments, to produce a set of populated table of contents pages having a specified number of pages;
   processing the set of populated table of contents pages to identify a set of title positions and a set of page number positions;
      wherein a title position of the set of title positions corresponds to a content segment title and a page number position of the set of page number positions corresponds to a content segment page number;
   establishing, based on the set of title positions and the set of page number positions, a set of pointers on the set of populated table of contents pages such that each pointer in the set of pointers indicates a start location of each successive contents segment of the merged PDF document;
   creating the merged PDF document by combining the set of table of contents pages with the at least two content segments, such that when a user views the merged PDF document and selects one of the set of pointers in one of the set of populated table of contents pages, the user is navigated to a corresponding portion of the merged PDF document; and
   storing the merged PDF document in a non-transitory storage for access and viewing by the user.

2. The method of claim 1, wherein the at least two content segments include one of: HTML-based content, URL-based content, pre-generated PDF documents, dynamic template-based content, and table-of-contents placeholder content.

3. The method of claim 1, further comprising, generating a table of contents template from a predefined default template.

4. The method of claim 1, further comprising, generating a table of contents template from a custom template provided by a user.

5. The method of claim 4, further comprising inserting HTML elements containing the title and page number information into a designated area of the custom template before converting it into a table of contents PDF buffer.

6. The method of claim 1, wherein each pointer indicating a start location of a respective portion of the merged PDF document is defined by a region having coordinates that encompasses both a title text and a corresponding page number text.

7. The method of claim 1, wherein each data structure of the corresponding content segment stores at least the title, the page number value, and the page count value are as an object.

8. The method of claim 7, wherein the object stores each of the title, the page number value, and the page count value in a key-value pair format.

9. The method of claim 1, wherein the at least two content segments are represented as at least two arrays, with each of the at least two arrays containing a set of objects.

10. The method of claim 9, wherein each object within the set of objects corresponds to a page of a content segment of the at least two content segments and includes methods or properties for manipulating content, layout, or metadata associated with the page.

11. The method of claim 1, wherein the set of populated table of contents pages are represented as an array, with the array containing a set of objects.

12. The method of claim 11, wherein each object within the set of objects corresponds to a page of the populated table of contents pages and includes methods or properties for manipulating content, layout, or metadata associated with the page.

13. The method of claim 1, wherein the set of title positions and the set of page number positions are stored in a set of objects.

14. The method of claim 1, further comprising using a PDF manipulation library to add link annotations to the populated table of contents pages, thereby enabling navigation from each pointer in the populated table of contents pages to a corresponding portion of the merged PDF document.

15. A system for creating a navigable PDF document, the system comprising:
- a processor;
- a non-transitory memory;
- an input interface, when executed by the processor, configured to receive an input comprising at least two content segments, each content segment, of the at least two content segments, associated having a corresponding data structure that includes at least a title, a page count value, and a page number value;
- a numbering process executable by the processor, and configured to determine, for each data structure, a page number value by adding together
  - an initial value of one,
  - an offset corresponding to a total number of table of contents pages, and
  - a total sum of the page counts of any previously processed content segments;
  - wherein if no previously processed content segments exist, the total sum of the page counts is zero;
- a table of contents template process executable by the processor, configured to generate a set of table of content pages with the title and the page number value of each content segment, of the at least two content segments, to produce a set of populated table of contents pages having a specified number of pages;
- a parsing process executable by the processor, and configured to process the table of contents to identify a set of title positions and a set of page number positions;
  - wherein a title position of the set of title positions corresponds to a content segment title and a page number position of the set of page number positions corresponds to a content segment page number;
- a pointer establishment process executable by the processor, and configured to, based on the set of title positions and the set of page number positions, a set of pointers on the set of populated table of contents pages that each indicate a start location of each successive contents segment of the merged PDF document; and
- a merging process executable by the processor, and configured to create a merged PDF document by combining the set of table of contents pages with the at least two content segments and store the merged PDF document in the non-transitory memory,
  - wherein when a user accesses the stored merged PDF document, and views the merged PDF document and selects one of the set of pointers in one of the set of populated table of contents pages, the user will be navigated to a corresponding portion of the merged PDF document.

* * * * *